Patented Sept. 8, 1953

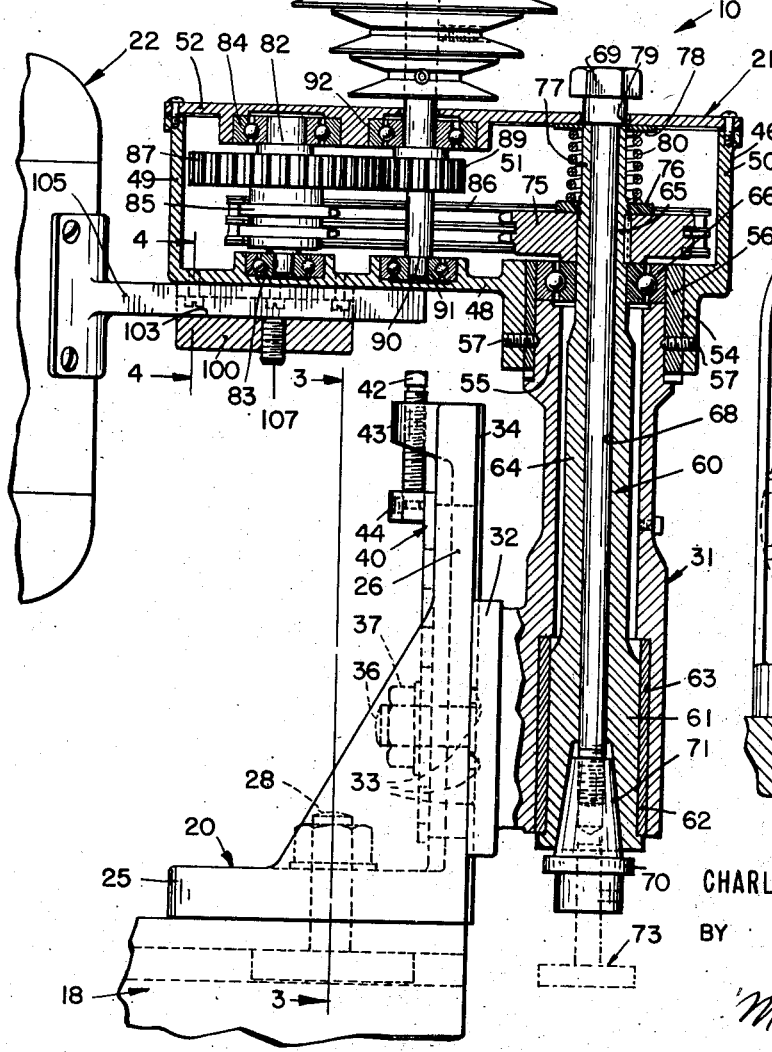

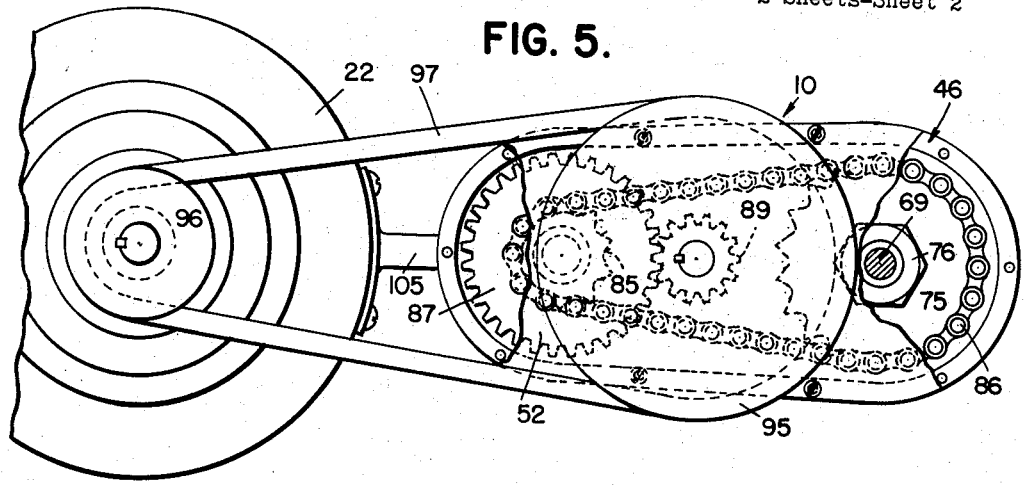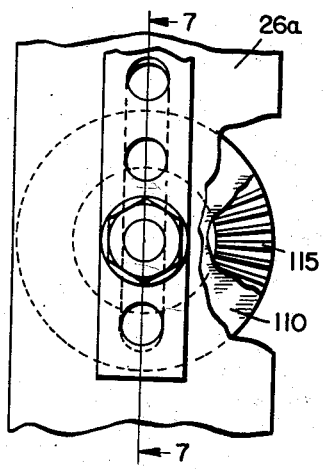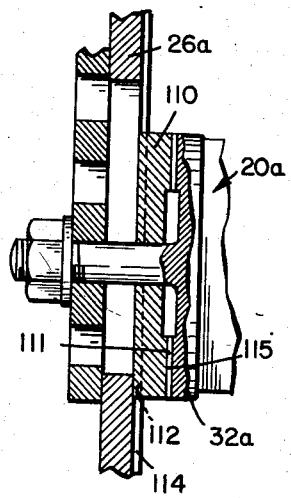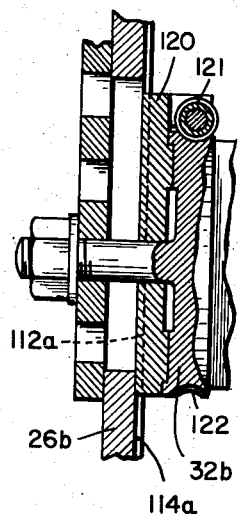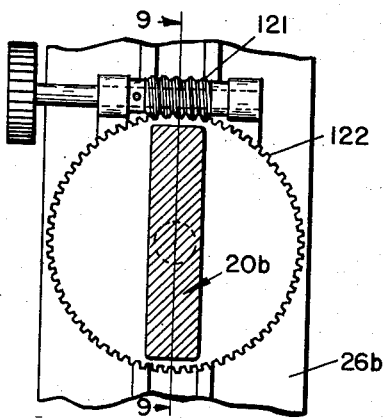

2,651,239

UNITED STATES PATENT OFFICE 2,651,239

MILLING ATTACHMENT FOR LATHES

Charles Schlagel, Inglewood, Calif.

Application November 19, 1948, Serial No. 61,038

2 Claims. (Cl. 90—17)

This invention has to do, generally, with attachments for lathes, and particularly with a milling attachment therefor.

An object of this invention is to provide a new and improved self-driven milling attachment for lathes, which can be readily attached to a lathe in a minimum of time.

Another object is to provide a milling attachment adapted to be mounted on the cross-feed or compound rest of the lathe and which will mill the full length and swing of the lathe.

A further object of the invention is to provide a device which is adjustable independently of the lathe element on which the device is mounted, both vertically and rotatably, to various radii of a pivotal axis parallel to the turning axis of the lathe.

Another object is to provide a milling attachment for lathes, having a milling element adapted to be mounted on the lathe and including a means for adjustably mounting a motor on said element. In this connection it is also an object to provide such a device in which the motor mounting means permits of the adjustment of the motor towards and away from the milling element so that a bolt drive may be used between the two and adjustment made thereof.

These and other objects will be apparent from the drawings and the following description thereof. Referring to the drawings, which are for illustrative purposes only:

Fig. 1 is a fragmentary elevational view of a lathe showing the milling attachment of the invention mounted thereon;

Fig. 2 is a fragmentary sectional elevational view of the milling attachment of the invention;

Fig. 3 is a sectional view on line 3—3 of Fig. 2;

Fig. 4 is a section on line 4—4 of Fig. 2;

Fig. 5 is a plan view, partly broken away, of the milling attachment;

Fig. 6 is a fragmentary elevational view of a modified form of attachment means for securing the milling element to the supporting bracket;

Fig. 7 is a sectional view on line 7—7 of Fig. 6;

Fig. 8 is a view similar to Fig. 6 of another modification; and

Fig. 9 is a sectional view on the line 9—9 of Fig. 8.

More particularly describing the invention, the invention, the milling attachment, indicated generally by 10, is shown mounted on an engine lathe 11, having the bed 12, head stock 13, and tail stock 14. The lathe is shown as being provided with the ordinary carriage 15, which travels on the screw 16. On the carriage is a cross-feed 17 which supports a compound rest 18.

The milling attachment 10 is shown mounted on a compound rest. However, it will be apparent that it may be supported on the carriage in any suitable manner.

Referring now particularly to Figs. 2 and 5, inclusive, the milling attachment 10 comprises, generally, a mounting bracket 20, a milling element 21, and a motor 22. The mounting bracket 20 may be an L angle, having a short base leg 25 and an upright leg 26. The base may be secured to the compound rest 18 or other desired part of the lathe by means of one or more T bolts 28.

The milling element 21 includes a milling cutter housing which includes a tubular spindle housing 31 having a mounting flange 32 near the lower end at one side thereof. The flange 32, in the form of the invention shown in Figs. 1 to 5, is provided with two sets of two parallel grooves 33 each, the sets being disposed at right angles to each other and adapted, respectively, to receive two vertical ribs 34 formed on the leg 26 of the mounting bracket. A threaded stud 36 and a nut 37 serve to secure the flange to the leg 26 of the mounting bracket in either the position shown or at right angles thereto as will be apparent.

The bolt 36 extends through a vertical slot in the mounting bracket and through any selected hole 39 of an adjusting bar 40. The bar 40 is mounted for accurate, vertical adjustment on the side of the bracket opposite to the side against which the mounting flange abuts. Adjustment is effected by rotating adjustment screw 42, which is threadedly mounted in a portion 43 of the bracket and which has its lower end mounted in the adjusting bar at 44.

The milling cutter housing includes, in addition to the spindle housing 31 previously described, a gear case or housing 46 which includes a bottom wall 48, upright walls 49, 50, and 51 and another wall corresponding to wall 51 but not shown. The element 47 is closed by a cover 52.

The bottom wall 48 of the gear case has a depending hub 54, in which is mounted the spindle housing. The spindle housing includes a cylindrical upper end portion 55, which is received within an eccentric bushing 56 in the hub 54, the parts being retained in position by set screws 57.

Mounted for rotation in the spindle housing is a cutter spindle 60, which has an enlarged lower end 61, received within a bronze bushing or other suitable bearing 62, located in a counterbore 63 in the lower end of the spindle housing. The central portion 64 of the spindle is reduced in size relative to the lower end portion and terminates just short of the upper end of the spindle housing, where the spindle has a second reduced portion 65, which is received within and carried by a bearing 66 positioned in the bushing 56 and at the upper end of the spindle housing.

The spindle is centrally bored at 68 to receive a drawbar 69 which is threaded at its lower end for securing tool-holding elements 70 in the frustro-conical portion 71 at the lower end of the spindle. Any suitable tool, such as the cutting tool 73, may be mounted in the element 70.

A sprocket 75 is keyed to the upper end portion 65 of the spindle and above this is a retaining nut 76 threadedly mounted on the spindle. Above the nut 76 the spindle is further reduced in diameter, terminating in an end 77. A lubricant retaining washer 78 is positioned about the upper end of the spindle and yieldably held against the cover in the region of an opening 79 through which drawbar 69 extends by means of a compression spring 80.

The gear case also houses a countershaft 82 which is mounted in the bearings 83 and 84 in the bottom wall 48 and cover 52 of the gear case, respectively. A sprocket wheel 85 is keyed to this shaft and operatively connected to the sprocket 75 by chain 86. The countershaft also carries a gear 87 which rotates with the shaft and meshes with a pinion 89 on a pulley shaft 90 carried by bearings 91 and 92 in the gear case bottom wall and cover, respectively. Any suitable number of pulleys 95 may be mounted on the outer end of this shaft, and a selected pulley is connected to a pulley 96 on the motor 22 by a belt 97.

As previously indicated, the motor 22 is preferably adjustably mounted on and carried by the milling cutter housing. This is accomplished by means of a motor bracket 100 which is provided with flanges 101 secured to the bottom wall of the gear case by machine screws 102. The element 100 co-operates with the gear case to provide a rectangular opening 103 for receiving a mounting bar 105 on the motor. A set screw 107 is provided for adjustably positioning the motor with respect to the gear case.

It will be apparent from the above description that the milling attachment may be readily secured to the cross-feed or the compound rest on the cross-feed of a lathe in a minimum of time. The milling cutter housing can then be adjusted on the mounting bracket. This is accomplished by selecting a suitable hole 39 in the adjusting plate for receiving the bolt 36 of the mounting flange and thereafter making final vertical adjustment by the screw 42. Also, the milling cutter housing may be mounted vertically as shown, or at right angles thereto, by causing the selected set of grooves 33 in the mounting flange 32 to register with the ridges 34 of the mounting bracket.

It will also be apparent that the belt 97 may be readily changed and the proper adjustment thereof made by adjustably positioning the motor with respect to the milling cutter housing.

The provision of the eccentric bushing 56 also makes it possible to adjust the slack of the chain 86.

In Figs. 6 and 7 there is shown a modified form of a mounting means for connecting the milling cutter housing and the mounting bracket to secure a greater number of positions of adjustment. In these figures reference numeral 20a indicates the mounting bracket, the leg 26a of which is shown provided with a circular mounting disc 110 provided with radial serrations 111 on its outer side. The other side of the disc is provided with a pair of parallel grooves 112 which slide on ribs or slideway 114 on the face of the leg 26a of the mounting bracket. The mounting flange, indicated by 32a, is formed to provide radial serrations 115 which mesh with those on part 110. With this construction the parts 32a and 110 may be adjustably secured together at any angle within the limit of the serrations.

In Figs. 8 and 9 there is shown another form of the invention wherein the leg 26b of the mounting bracket 20b, is provided with a plate 120 on which is mounted a worm gear indicated by 121, which meshes with teeth 122 formed on a circular mounting flange 32b of the milling cutter housing. The plate 120 and leg 26b have interengaging grooves and ribs 112a and 114a, respectively. It will be apparent that with this device accurate adjustment of the milling cutter on the bracket may be obtained. Any suitable indicia may be provided for indicating the angle of disposition of the parts.

Although the invention has been particularly shown and described, it is contemplated that various changes and modifications can be made without departing from the scope thereof as set forth in the following claims.

I claim:

1. In a milling attachment for a lathe having a cross feed, a mounting bracket adapted to be secured to the cross feed of the lathe, a milling cutter housing having a rotatable milling cutter spindle therein, a means for adjustably mounting said housing on said bracket, said means including interengaging elements on said housing and bracket providing a plurality of predetermined positions in which the housing and bracket may be positioned relative to each other and preventing relative rotation thereof when said housing and bracket are in a selected position, releasable securing means for holding said housing and bracket in a selected position, said releasable securing means including a vertically adjustable bar and an attachment means for releasably attaching said housing to said bar, and means for vertically moving and accurately positioning said adjustable bar.

2. An adjustable mounting means, comprising a mounting bracket having a slotted leg, an adjusting bar mounted on one side of said leg constructed and arranged for movement thereon longitudinally of the slot in the leg, an element to be mounted on said bracket, said element having a mounting flange, a mounting disc interposed between said leg and said mounting flange, interengaging guide means on said leg and said disc for guiding said disc longitudinally of said slot, interengaging means on said disc and said mounting flange for adjustably rotatively positioning said bracket and mounting flange with respect to each other and bolt means extending through said slot and connecting said adjusting bar and said element.

CHARLES SCHLAGEL.

References Cited in the file of this patent

UNITED STATES PATENTS

| Number | Name | Date |
|---|---|---|
| 181,696 | Main | Aug. 29, 1876 |
| 253,314 | Richmann | Feb. 7, 1882 |
| 613,425 | Saati | Nov. 1, 1898 |
| 844,892 | Pfander | Feb. 19, 1907 |
| 1,217,949 | Jay | Mar. 6, 1917 |
| 1,348,183 | Rayfield | Aug. 3, 1920 |
| 1,497,113 | Meyer | June 10, 1924 |
| 1,530,566 | Lobbett | Mar. 24, 1925 |
| 1,974,084 | Sarossy | Sept. 18, 1934 |
| 2,281,353 | Hubbard | Apr. 28, 1942 |
| 2,375,789 | Hungerford | May 15, 1945 |
| 2,386,461 | Hellman | Oct. 9, 1945 |
| 2,453,315 | Harbison | Nov. 9, 1948 |
| 2,500,880 | Solomon | Mar. 14, 1950 |
| 2,502,851 | Jones et al. | Apr. 4, 1950 |